United States Patent [19]

LeDoux et al.

[11] Patent Number: 5,488,824
[45] Date of Patent: Feb. 6, 1996

[54] THROTTLE CONTROL DEVICE CONTROLLING TWO ENGINES OF A SAME AERODYNE

[75] Inventors: Jean-Pierre LeDoux, Verrieres le Buisson; Alain Cognard, Antony; Claude Bedoya, Montigny le Bretonneux, all of France

[73] Assignee: Sextant Avionique, Meudon la Foret, France

[21] Appl. No.: 337,838

[22] Filed: Nov. 9, 1994

[30] Foreign Application Priority Data

Dec. 13, 1993 [FR] France .................................. 93 15050

[51] Int. Cl.⁶ .................................. F02C 6/00; F02C 9/00
[52] U.S. Cl. .................. 60/39.15; 74/490.11; 74/625; 244/234
[58] Field of Search .................................. 60/37.15, 233, 60/243, 224; 74/490.10, 490.11, 625; 244/196, 197, 234

[56] References Cited

U.S. PATENT DOCUMENTS 3,363,480  1/1968  Murphy ................................. 74/625
3,599,510  8/1971  Scott et al. ........................... 74/625
4,805,396  2/1989  Veerhusen et al. .
5,188,316  2/1993  Dressler et al. ....................... 244/234

FOREIGN PATENT DOCUMENTS 3336546  5/1985  Germany .
8401446  4/1984  WIPO .

*Primary Examiner*—Louis J. Casaregola
*Attorney, Agent, or Firm*—Browdy and Neimark

[57] ABSTRACT

The throttle control device controlling two engines of a same aerodyne which embodies the invention uses a drive mechanism mounted rotatably about a fixed axis and rotated by means of a servomotor controlled by a computer ensuring automatic flight velocity control for the aircraft, two levers respectively integral with two annular elements mounted rotatably about said axis, on both sides of the drive mechanism, two electromagnetic couplers respectively disposed between said annular elements and said drive mechanism, and two angular position sensors respectively associated with the two annular elements, these two sensors being respectively connected to the throttle control circuits of the engines of the aircraft. This system ensures the independence of the two levers and the level of safety required for automatic control of the aircraft.

8 Claims, 2 Drawing Sheets

THROTTLE CONTROL DEVICE CONTROLLING TWO ENGINES OF A SAME AERODYNE

BACKGROUND OF THE INVENTION

1. Field of the Invention

This invention relates to a throttle control device controlling a pair of engines of an aerodyne, e.g. the two engines of a twin-engined airplane.

2. Description of the Prior Art

Generally, it is known that, in control systems currently in use, the throttle levers are coupled to a respective servomotor associated with an automatic control computer via a disengageable linkage.

It is obvious that the use of two levers for two respective engines implies multiplying the number of electromechanical systems by two and therefore a notable increase in the overall space requirements and cost.

OBJECT OF THE INVENTION

The main object of this invention is to reduce the preceding disadvantages, particularly by performing control of the two throttle levers by means of a single servomotor while ensuring, on the one hand, the independence of the two levers, and, on the other hand, the level of safety required for automatic control of the velocity of the aircraft.

SUMMARY OF THE INVENTION

Accordingly, there is provided a device using a drive mechanism mounted rotatably about a fixed axis and rotated by means of a servomotor controlled by a computer ensuring automatic flight velocity control for the aircraft, two levers respectively integral with two annular elements mounted rotatably about said axis, on both sides of the drive mechanism, two electromagnetic couplers respectively disposed between said annular elements and said drive mechanism, and two angular position sensors respectively associated with the two annular elements, these two sensors being respectively connected to the throttle control circuits of the engines of the aircraft.

Advantageously, the drive mechanism can comprise two coaxial cylindrical sleeves integral with one another in their middle part by way of an annular strut, the sleeve of smallest diameter serving as a bearing for the rotary mounting of the drive mechanism about said axis while the sleeve of largest diameter comprises a means for rotating from the servomotor.

In this case, the annular elements can each comprise an annular portion extending axially into one of the annular cavities formed between the two cylindrical sleeves on either side of the strut.

This annular portion can comprise an electromagnet capable of exerting traction on an armature designed to act upon coaxial clutch disks respectively interdependent in rotation with the annular portion and with at least one of said cylindrical sleeves, but axially mobile in relation to the latter.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENTS

Figure 1:
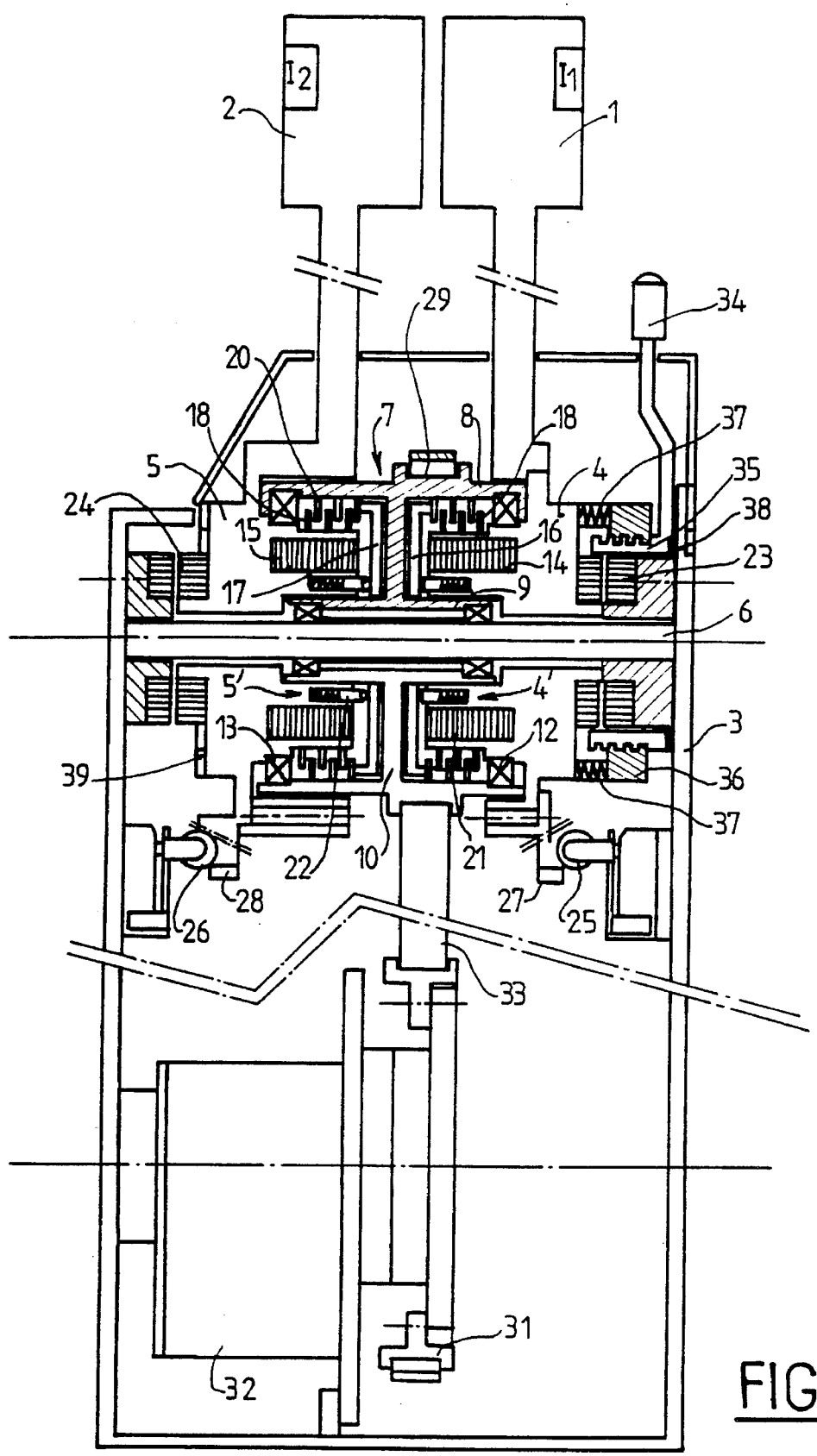
FIG. 1 is an axial sectional drawing of the mechanism of a device for controlling two levers according to the invention.

In the example represented in FIG. 1, the throttles of the aircraft are controlled by two levers 1, 2 supported by a bracket 3 situated e.g. between the pilot's and copilot's seats in the cockpit of the aircraft.

Each of these levers 1, 2 is made integral, at its lower end, with an annular element 4, 5 mounted rotatably about a horizontal axis 6 mounted fixedly in the bracket 3.

The two annular elements 4, 5 are arranged one on each side of a drive mechanism 7 mounted rotatably on the shaft 6.

In this example, the drive mechanism 7 is formed by two coaxial cylindrical sleeves 8, 9 made integral with one another in their middle part by means of an annular strut 10.

This strut 10 delimits, between the two sleeves 8, 9, two coaxial cylindrical cavities into each of which fits an annular portion 4', 5' of a respective annular element 4, 5.

The sleeve of smallest diameter 9 is mounted rotatably about the axis 6 by means of ball bearings; its outer cylindrical surface serves as a bearing for the annular elements 4, 5.

The rotary mounting of the annular elements 4, 5 on the drive mechanism 7 is further completed by ball bearings 12, 13 arranged between the outer surface of the annular element 4, 5 and the inner surface of the sleeve of largest diameter 8.

Each of the annular elements comprises a coaxial cavity housing a winding 14, 15, this unit constituting the electromagnet of an electromagnetic coupler of which the mobile armature 16, 17 is comprised of a washer fitted with an outer flange housed between the element 4, 5 and the annular strut 10.

The outer cylindrical surface of each of the annular portions 4, 5 comprises axial splines and bears coaxial friction disks 18 which are axially mobile though interdependent in rotation with said portion (by way of serrations formed on the inner edge of the disks 18 which fit into the splines).

Likewise, the inner cylindrical surface of the sleeve 8 has axial splines serving to prevent rotation of the friction disks 20 disposed coaxially and alternately with the friction disks 18.

The armature 16, 17 is designed is such a way that, when the coil 14, 15 is energized, the flange presses the friction disks 18, 20 against one another, thereby rendering the drive mechanism 7 interdependent with the annular element 4, 5 (clutch).

Conversely, when the coil 14, 15 is in the de-energized state, the armature 16, 17 is pushed back against the strut 10 by means of axial pushing devices 21, 22 acted upon by springs provided in the annular elements 4, 5. In this state, the friction disks 18, 20 are no longer held tightly against one another and no longer ensure transmission between the drive mechanism 7 and the annular element 4, 5 in question.

The angular position of the annular elements 4, 5 (and therefore of the levers) is detected by two respective coaxial sensors 23, 24 integral with the supporting structure of the bracket 3.

This detection is further completed by at least two end-of-travel microswitches 25, 26 operated by two cams 27, 28 respectively fixed to the two annular elements 4, 5. More particularly, the purpose of these microswitches 25, 26 is to detect the positions of end-of-travel stops (e.g. the lowest idling speed position) of the levers 1, 2.

The outer surface of the sleeve of largest diameter 8 is further shaped in its middle region so as to act as a grooved pulley 29, coupled with the grooved pulley 31 of a servomotor 32, via a belt 33.

This servomotor 32 is itself controlled by a throttle control system of the airplane which usually comprises a computer for automatic control of flight velocity.

The rotary assembly comprising the drive mechanism 7 and the two annular elements 4, 5 bearing the levers 1, 2 can be subjected to a friction torque of an amplitude that can be adjusted by means of a lever 34.

In this example, this lever 34 is mounted onto a cylindrical socket 35 mounted rotatably, coaxially with the axis 6, about the sensor 23.

On the threaded outer surface of this socket 35 is screwed a nut 36 that is axially mobile though fixedly prevented from rotating. This nut 36 axially rests against the rotary assembly by means of springs 37.

The radial flank of the socket 35, situated on the opposite side of the rotary assembly, leans against a coaxial friction washer 38. Likewise, a coaxial friction washer 39 is also provided between the outer radial flank of the annular element 5 and a stop ring that is fixedly integral with the bracket 3.

The device described above operates as follows:

In manual operation, the coils 14 and 15 are in the de-energized state and the annular elements 4, 5 are therefore in the disengaged state. The two throttle levers 1, 2 can then be freely and independently positioned by the crew. Positional data concerning the levers are transmitted to the throttle control system by means of the sensors 23, 24.

In automatic operation, the two coils 14, 15 are energized so as to ensure a coupling, by means of the friction disks 18, 20, between the drive mechanism 7 and the annular elements 4, 5. Accordingly, at the time of clutching in, the two throttle levers 1, 2 are coupled with the servomotor 32 while retaining their initial position. The levers are then operated by the servomotor 32 in accordance with the orders it receives from the computer.

If, after clutching in, the crew wishes to modify the relative position of the two throttle levers 1, 2, it can do so by exceeding the magnetic torque applied by the two couplers.

In the event of engine failure of one of the aircraft's engines, the throttle lever 1, 2 corresponding to this engine is put into the lowest idling speed position by the crew, said position being detected by the corresponding microswitch 25, 26. This microswitch 25, 26 then acts in such a way as to de-energize the coil 14, 15 of the corresponding magnetic coupler which then moves into the disengaged state.

Thus, in automatic operation, only the throttle lever 1, 2 corresponding to the healthy engine is coupled to the servomotor 32, which enables automatic control of the airplane with a single engine.

Should the crew wish to disengage both levers 1, 2 it can of course perform this disengaging by operating a fast disengaging switch provided on the handle of each of the levers 1, 2.

By means of the lever 34, the pilot can adjust the friction torque exerted on the rotary assembly and therefore the reaction power that the throttle levers 1, 2 oppose to the pilot's action.

In fact, rotation of the lever 34 causes an axial displacement of the screw 36 and therefore a variation of the strain brought to bear between the lever 34 and the mobile assembly by means of the springs 37. There ensues a variation of the frictional forces brought to bear on the mobile assembly by the friction washers 38, 39.

It should be specified that the variation of frictional forces brought to bear by the washers 38, 39 is due to the fact that the rotary assembly has a slight axial mobility as a result of which the strains brought to bear by the springs 37 on the annular element 4 have repercussions on the drive mechanism 7 and on the annular element 5 through the presence of the ball bearings 12, 13 (which are arranged in such a way as to retransmit the axial exertions). These exertions are contained by the friction washers 38, 39 which rest against the structure of the bracket 3.

Figure 2:
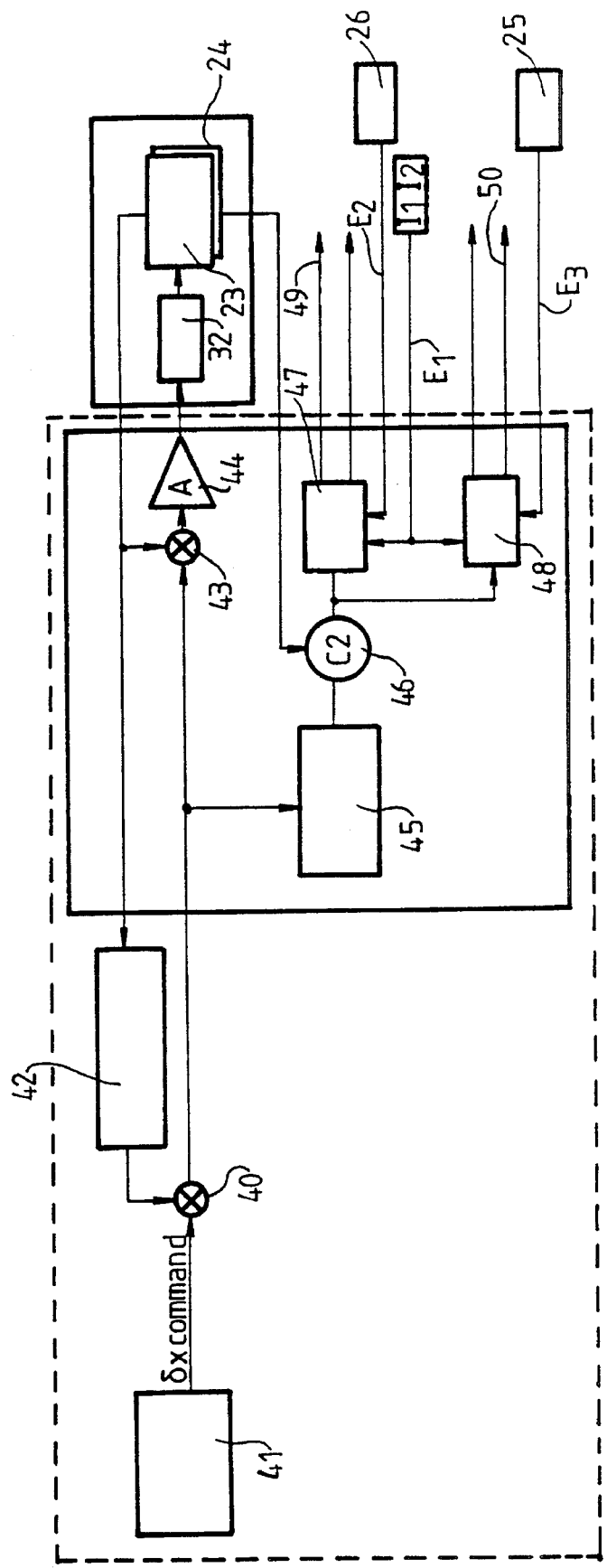
FIG. 2 is a synoptic diagram of the circuit for monitoring and controlling the disengageable linkages of the device in FIG. 1.

The device previously described can be connected to a control and monitoring circuit of the type illustrated in FIG. 2.

In this example, the servomotor 32 is controlled by a control loop circuit using:

a first subtracter 40 which receives a control signal $\delta_x$ from a computer 41 ensuring automatic flight velocity control for the aircraft and a signal representing the initial position of the servomotor and which is provided by a memory 42 coupled to the sensor 23, a second subtracter 43 which receives, on the one hand, a signal coming from the sensor 23 and representing the angular position of the servomotor 32, and, on the other hand, a control signal from the subtracter 40 (this signal taking into account the initial position of the levers), a power amplifier 44 of which the input is connected to an output of the subtracter 43 and of which the output supplies power to the servomotor 32.

The monitoring function is performed by means of a device using:

a circuit 45 simulating the control loop 43, 44, 32, 23 which issues information concerning the angular position of the servomotor, a comparator 46 which compares the angular position determined by the simulating circuit with the actual position of the sensor 24, and two logic circuits 47, 48 each receiving data provided by the subtracter, these circuits each comprising a means (arrows 49, 50) enabling the levers 1, 2 to be disengaged when the comparator 46 detects an inconsistency between the two input signals.

The two logic circuits 47, 48 further comprise an input $E_1$ connected to the disengaging switches $I_1$, $I_2$ provided on the two levers 1, 2, and two other inputs $E_2$, $E_3$ respectively connected to the end-of-travel microswitches 25, 26 in order to enable the disengaging of one lever 1, 2 when the latter is put into a position outside its range of use by the pilot or by the servomotor.

By way of these arrangements, the safety conditions usually required for automatic flight velocity control are met.

We claim:

1. A throttle control device controlling two engines of a same aerodyne, using a drive mechanism mounted rotatably about a fixed axis and rotated by means of a servomotor controlled by a computer ensuring automatic flight velocity control for the aerodyne, two levers respectively integral with two annular elements mounted rotatably about said axis, on both sides of said drive mechanism, two electromagnetic couplers respectively disposed between said annular elements and said drive mechanism and two angular position sensors respectively associated with said two annular elements, said two sensors being respectively connected to throttle control circuits of said engines.

2. A throttle control device controlling two engines of a same aerodyne, using a drive mechanism mounted rotatably about a fixed axis and rotated by means of a servomotor controlled by a computer ensuring automatic flight velocity control for the aerodyne, two levers respectively integral with two annular elements mounted rotatably about said axis, on both sides of said drive mechanism, two electromagnetic couplers respectively disposed between said annular elements and said drive mechanism and two angular position sensors respectively associated with said two annular elements, said two sensors being respectively connected to throttle control circuits of said engines, wherein the drive mechanism comprises two coaxial cylindrical sleeves integral with one another in their middle part by way of an annular strut, the sleeve of smallest diameter serving as a bearing for the rotary mounting of the drive mechanism about said axis while the sleeve of largest diameter comprises a means for rotating from the servomotor.

3. The device as claimed in claim 2, wherein said annular elements comprise two respective annular portions extending axially into corresponding annular cavities formed between said two coaxial cylindrical sleeves on either side of said annular strut.

4. The device as claimed in claim 3, wherein said annular portion comprises an electromagnet capable of exerting traction on an armature designed to act upon coaxial clutch disks respectively interdependent in rotation with the annular portion and with at least one of said coaxial cylindrical sleeves, but axially mobile in relation to the latter.

5. A throttle control device controlling two engines of a same aerodyne, using a drive mechanism mounted rotatably about a fixed axis and rotated by means of a servomotor controlled by a computer ensuring automatic flight velocity control for the aerodyne, two levers respectively integral with two annular elements mounted rotatably about said axis, on both sides of said drive mechanism, two electromagnetic couplers respectively disposed between said annular elements and said drive mechanism and two angular position sensors respectively associated with said two annular elements, said two sensors being respectively connected to throttle control circuits of said engines, wherein said annular elements and said drive mechanism form an assembly axially mobile on said axis, a lever is mounted on a cylindrical socket mounted rotatably coaxially with said axis, on the threaded outer surface of this socket is screwed a nut that is axially mobile though fixedly prevented from rotating, said nut axially rests against said mobile assembly by means of springs so as to exert an adjustable friction torque on said mobile assembly.

6. The device as claimed in claim 2, wherein the servomotor is controlled by a loop control circuit using:

a first subtracter which receives a control signal from a computer ensuring automatic flight velocity control for the aircraft and a signal representing the initial position of the levers and which is provided by a memory coupled to the sensors, a second subtracter which receives, on the one hand, a signal coming from said sensors and representing the angular position of the levers, and, on the other hand, a control signal from said subtracter (this signal taking into account the initial position of said levers), a power amplifier of which the input is connected to an output of said subtracter and of which the output supplies power to the servomotor.

7. The device as claimed in claim 6, further comprising a monitoring device using:

a circuit simulating the control loop which issues information concerning the angular position of the levers, a comparator which compares said angular position determined by the simulating circuit with the actual position of the sensors, and two logic circuits receiving data provided by the subtracter, these circuits each comprising a means enabling said levers to be disengaged when said comparator detects an inconsistency between the two input signals.

8. The device as claimed in claim 1, wherein said two levers are provided with two respective switches which control said electromagnetic couplers.

* * * * *